3 Sheets
Sheet 1

William A. Lewis' Improved Manufacture to be used in the Construction of Axles for Wagons &c. No. 119,868. Patented Oct. 10, 1871.

Witnesses,
J. C. Rifkind
J. H. A. Daniels

Wm. A. Lewis, Inventor,

William A. Lewis' Improved Manufacture to be used in the Construction of Axles for Wagons &c. No. 119,868. Patented Oct. 10, 1871.

Witnesses,

Inventor,
Wm A Lewis

3 Sheets
Sheet 3.

William A. Lewis' Improved Manufacture to be used in the Construction of Axles for Wagons &c.

No. 119,868. Patented Oct. 10, 1871.

Figure 8:
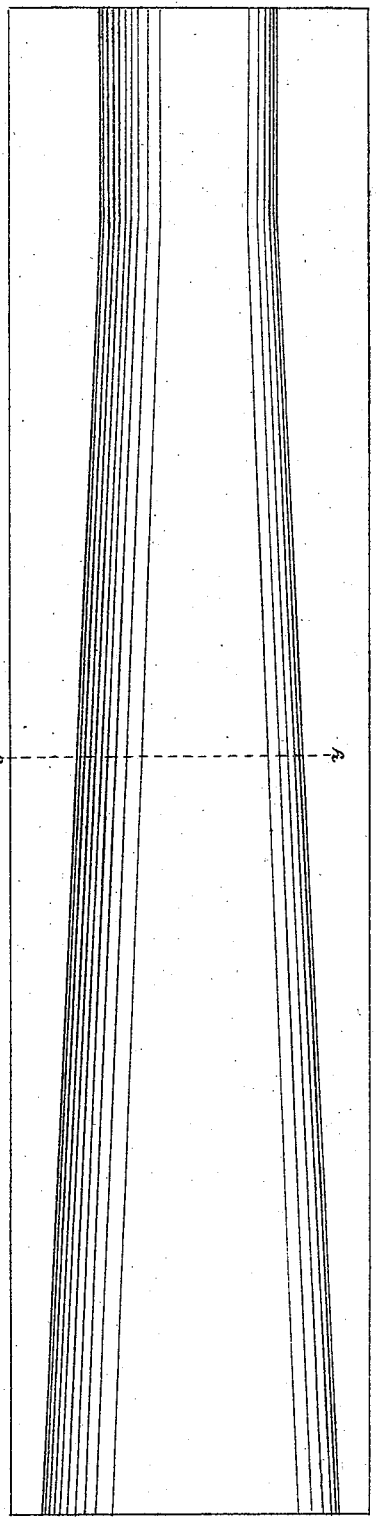

Section thro' dotted line of Fig. 8.

Figure 6:
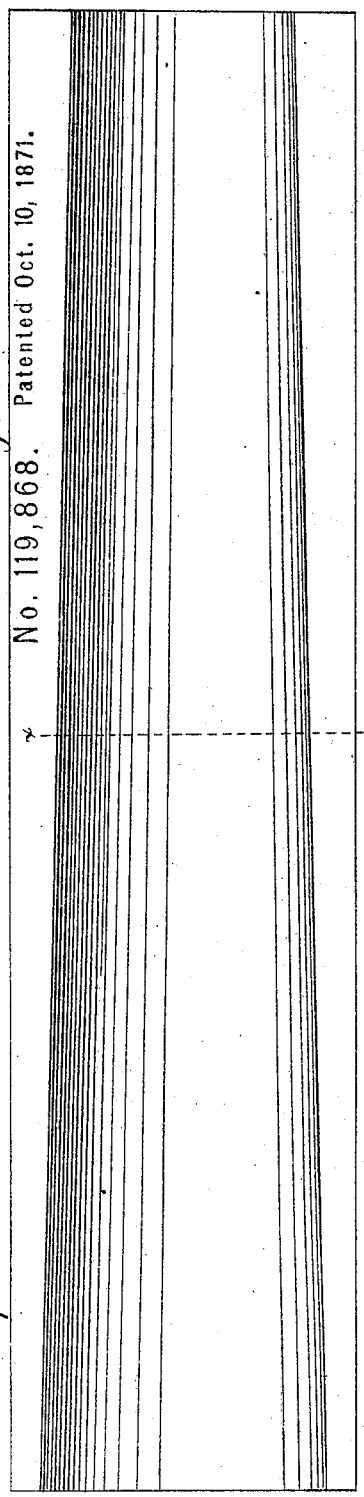

Section thro' dotted line of Fig. 6.

Witnesses,

Inventor,

UNITED STATES PATENT OFFICE.

WILLIAM A. LEWIS, OF CHICAGO, ILLINOIS, ASSIGNOR TO HOLLOW-AXLE MANUFACTURING COMPANY, OF MISHAWAKA, INDIANA.

IMPROVEMENT IN WROUGHT-METAL AXLES FOR WAGONS AND CARRIAGES.

Specification forming part of Letters Patent No. 119,868, dated October 10, 1871.

*To all whom it may concern:*

Be it known that I, WILLIAM A. LEWIS, of Chicago, in the county of Cook and State of Illinois, have invented a new manufacture in the shape of a parallel-sided wrought-metal tube with tapering terminations, said manufacture to be used, in combination with a suitable stock and trimmings, in the production of axles for wagons, carriages, &c.; and I do hereby declare that the following is a full and exact description of said invention, reference being had to the accompanying drawing which forms a portion of this specification.

Figure 1:
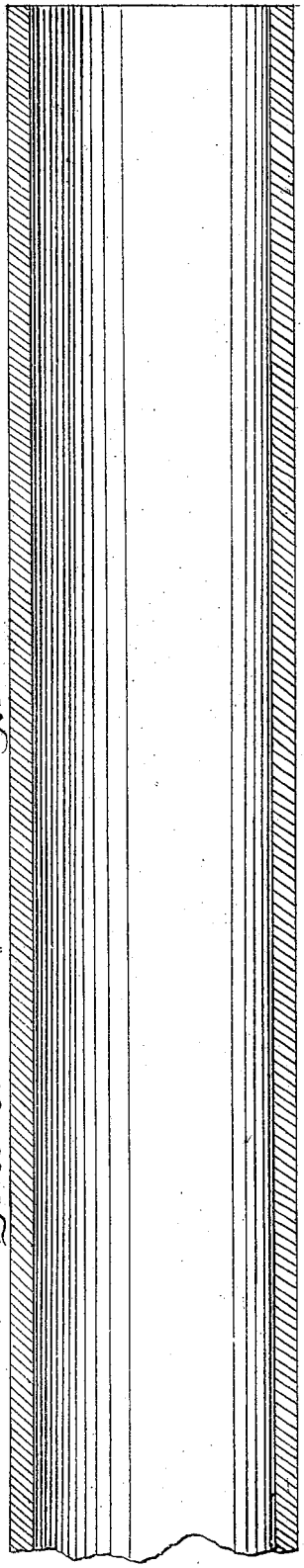

Figure 1 of the drawing represents a longitudinal section of a sufficient length of wrought-metal tubing to form one of the tapering terminations and a portion of the body of my said new manufacture.

Figure 2:
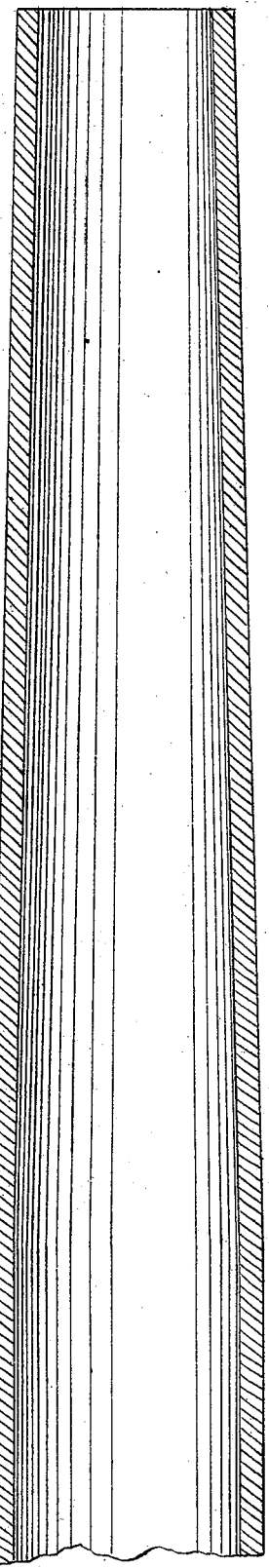
Figure 9:
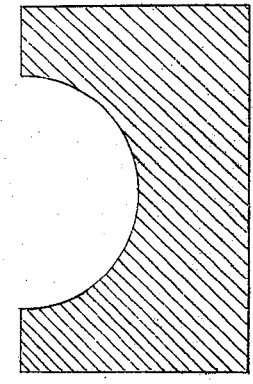
Figure 7:
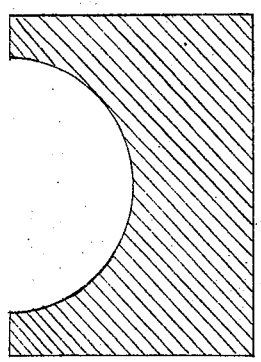

In the production of said manufacture I proceed as follows: Taking a wrought-metal tube of about the diameter and thickness of sides represented by Fig. 1, and the proper length for the axle to be formed, I first place one end of said tube in a furnace and raise the same to a welding temperature; then I place the heated-end portion of said tube in a swaging-machine, which is supplied with a stationary and a movable die of the respective shape shown by Figs. 6 and 7, and immediately subject the said heated tube end to rapid percussive blows between the said dies while the tube is revolved upon its axis, which operation gives to the said heated tube end the shape shown by Fig. 2. And when said operation is completed the tube is withdrawn from the swaging-machine and the portion thereof which has been thus preliminarily operated upon is again raised to a welding heat, and is then again subjected to rapid percussive blows between a stationary and a movable die of the respective shape, shown by Figs. 8 and 9 of the drawing, which second swaging operation reduces the said end portion of the tube to the shape represented by Fig. 3, which is the usual shape for the end portions of my said improved manufacture. After both the end portions of the said wrought-metal tube have been brought to the desired tapering shape it is ready for the further finishing, stocking, and trimming operations required for the production of an improved axle for wagons, carriages, &c., of which the said tube will form the chief constituent part.

Figure 3:
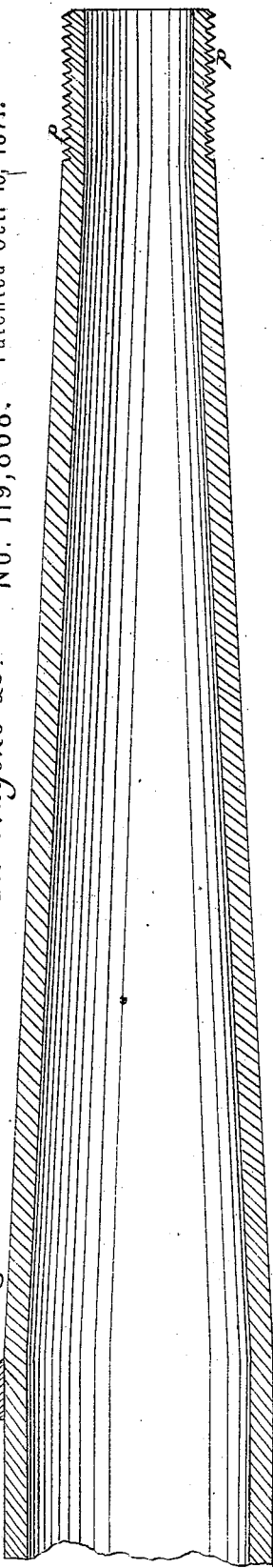
Figure 4:
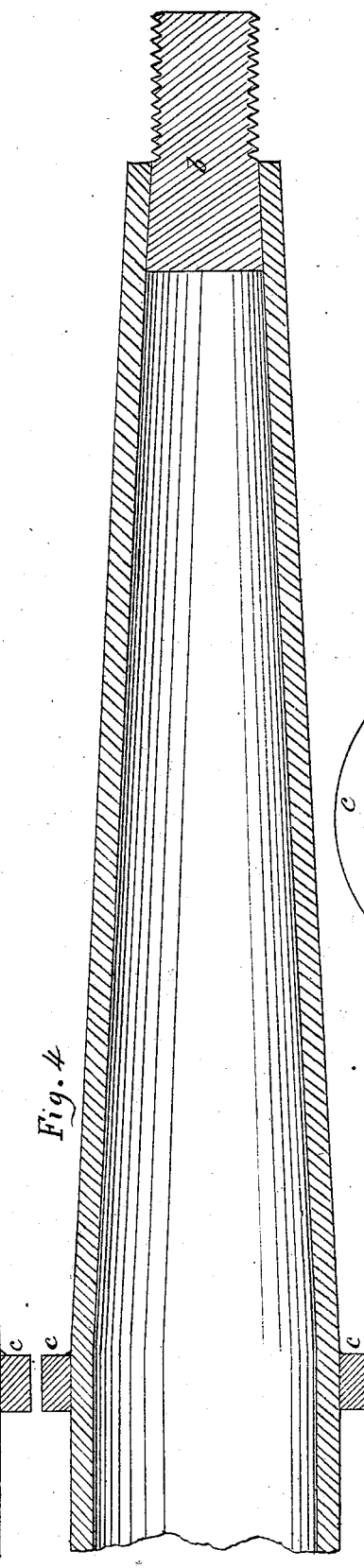
Figure 5:
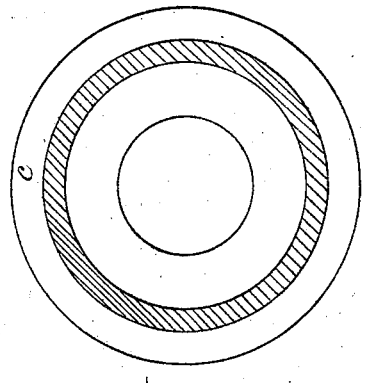

For the reception of the wheel-retaining screw-boxes the terminating portions of the tapered ends of my said improved manufacture may be swaged to a parallel-sided shape, and screw-threads $p\ p$ may be cut thereupon, as shown in Fig. 3; or, if preferred, instead of cutting the screw-threads $p$ on the outer ends of the tapering portions of my said new manufacture, a blank or a screw-cut plug, $b$, may be inserted in succession into each of the open and somewhat shorter tapered ends of said manufacture after the same have been subjected to the first of the before-described heating and swaging operations, and be secured therein by the following heating and swaging operations upon the same. The journal-shoulders may be formed of cast-metal rings $c\ c$, Figs. 3, 4, and 5, shrunk upon the tube; or, each of said rings may be cast in a single piece, with a sleeve, $e$, to embrace the inner portion of each tapered termination of said tube, if preferred by the manufacturer; or, each of the shoulder-rings $c$ may be cast in one piece, with a clip-offset, $f$, Figs. 10 and 11, for the reception of the legs of the clip $g$, which securely combines each end of the axle-stock $h$ with my said improved tubular portion of the completed axle.

Figure 10:
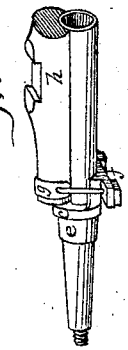
Figure 11:
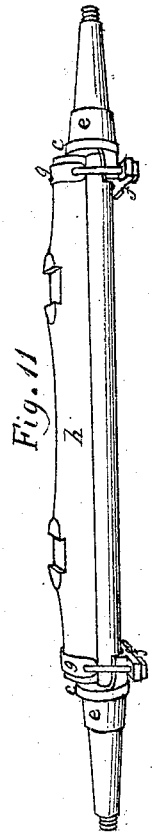

Figs. 10 and 11 of the drawing are representations of one style of finished axle, that can be produced by the combination of an axle-stock and suitable trimmings with my new manufacture in the shape of a wrought-metal tube having tapering terminations.

The tapering terminations of my said improved tubular portion of an axle may be case-hardened to increase their durability when it is intended that they shall work directly in contact with the interior surfaces of the wheel-boxes; or, cast-metal sleeves may be shrunk upon said terminations to receive the friction of the wheel-boxes, at the option of the manufacturer.

For the purpose of giving a greater degree of bearing stiffness and strength to my said new manufacture in the shape of a wrought-metal tube with tapering terminations, to be employed in the manufacture of axles, an elliptical shape may be given to the body portion of said tube.

I do not intend to limit myself to any precise length of the tapering terminal portions of my said new manufacture, nor to any precise degree of inclination of the outlines of the said terminal portions, while the said portions are sufficiently tapering to allow them to receive the journal-shoulders or sleeves that are to be combined therewith in the production of an axle of which my said new manufacture shall form the chief constituent part.

I claim as my invention—

1. As a new manufacture, a parallel-sided wrought-metal tube, the end portions of which are taper-swaged, by substantially the process herein described, to such shape as will enable said tube to be used as a constituent in the construction of axles for wagons, &c.

2. The combination of my within-described taper-swaged wrought-metal tube with the requisite stock and trimmings to form a wagon or carriage-axle of any usual or desired shape.

WM. A. LEWIS.

Witnesses:
Z. C. ROBBINS,
H. A. DANIELS. (30)